(12) United States Patent
Harke et al.

(10) Patent No.: US 11,671,038 B2
(45) Date of Patent: Jun. 6, 2023

(54) CONTROL OF A WOUND FIELD SYNCHRONOUS GENERATOR FOR TRANSIENT LOAD RESPONSE

(71) Applicant: Hamilton Sundstrand Corporation, Charlotte, NC (US)

(72) Inventors: Michael C. Harke, DeForest, WI (US); John F. Defenbaugh, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/537,099

(22) Filed: Aug. 9, 2019

(65) Prior Publication Data

US 2021/0044231 A1 Feb. 11, 2021

(51) Int. Cl.
*H02P 9/00* (2006.01)
*H02P 9/10* (2006.01)
*H02P 9/36* (2006.01)

(52) U.S. Cl.
CPC ............... *H02P 9/00* (2013.01); *H02P 9/102* (2013.01); *H02P 9/36* (2013.01)

(58) Field of Classification Search
CPC .. H02P 9/102; H02P 9/36; H02P 9/00; H02M 7/04
See application file for complete search history.

(56) References Cited

U.S. PATENT DOCUMENTS

| 4,015,189 A | 3/1977 | Gorden |
| 4,032,835 A | 6/1977 | Finnell et al. |
| 5,648,705 A * | 7/1997 | Sitar ............... H02J 7/1492 318/145 |
| 8,928,293 B1 | 1/2015 | Rozman et al. |
| 9,054,610 B2 | 6/2015 | Rozman et al. |
| 9,143,070 B2 | 9/2015 | Rozman et al. |
| 9,590,550 B2 | 3/2017 | Desabhatla et al. |
| 10,110,079 B2 | 10/2018 | Gehrke et al. |
| 2004/0066044 A1 * | 4/2004 | Matsuo ............... H02P 9/04 290/52 |
| 2005/0286179 A1 * | 12/2005 | Huff ............... H02J 3/50 361/20 |

(Continued)

FOREIGN PATENT DOCUMENTS

| EP | 0716496 A1 | 6/1996 |
| EP | 3182579 A1 | 6/2017 |
| EP | 3358179 A1 | 8/2018 |

OTHER PUBLICATIONS

Extended European Search Report dated Jul. 15, 2020, issued during the prosecution of European Patent Application Mo. EP 19216165.1.

*Primary Examiner* — Viet P Nguyen
(74) *Attorney, Agent, or Firm* — Locke Lord LLP; Scott D. Wofsy; Judy R. Naamat

(57) ABSTRACT

A method and controller for controlling a Wound Field Synchronous Machine (WFSM) of an electric power generation system (EPGS) having a field winding and a stator armature winding is provided. The controller includes an adjustable component coupled to the generator and a power factor controller for adjusting the adjustable component to lower the power factor of the WFSM as a function of power output to a load of the EPGS to stabilize a current in the field winding.

23 Claims, 9 Drawing Sheets

(56) References Cited

U.S. PATENT DOCUMENTS

| | | | |
|---|---|---|---|
| 2006/0214645 A1* | 9/2006 | Rufer | H02M 5/4585 |
| | | | 322/28 |
| 2009/0121483 A1* | 5/2009 | Xiong | F03D 7/0284 |
| | | | 290/44 |
| 2013/0016546 A1 | 1/2013 | Mountain | |
| 2013/0181688 A1* | 7/2013 | Tupper | H02P 9/02 |
| | | | 322/61 |
| 2013/0313828 A1* | 11/2013 | Moreau | H02P 9/14 |
| | | | 290/44 |
| 2015/0349688 A1* | 12/2015 | Wagoner | H02P 23/26 |
| | | | 290/44 |
| 2017/0114665 A1* | 4/2017 | Gemin | F16F 15/00 |
| 2017/0170762 A1* | 6/2017 | Blackwelder | H02P 9/10 |
| 2017/0170765 A1* | 6/2017 | Blackwelder | H02P 9/08 |
| 2020/0130531 A1* | 4/2020 | Wang | B60L 58/14 |

* cited by examiner

CONTROL OF A WOUND FIELD SYNCHRONOUS GENERATOR FOR TRANSIENT LOAD RESPONSE

BACKGROUND

1. Field of the Disclosure

The present disclosure relates to controlling a wound field synchronous generator controller, and more particularly, to controlling the wound field synchronous generator controller for responding to transient load.

2. Description of Related Art

A generator includes an exciting stator and rotor coupled to a wound field synchronous machine (WFSM), which includes a field winding that rotates and produces an electrical field in a stator armature winding via which power is can be provided to a load. When a generator having a WFSM provides power to a load, there can be an unwanted time delays associated with transient responses to large load changes.

A contributing factor for this delay is that when the WFSM provides power to a load that is operating at light power (also referred to as light load, which is for example ~10% of full power for the load (also referred to as full load)), magnitude of a field voltage and an armature reaction flux of the WFSM is much smaller than a full load case. In order for the WFSM to respond to a step load transient from light load to full load, a generator control unit (GCU) would sense a voltage droop at a point-of-regulation (POR) and increase an excitation field current and subsequently the field voltage. In response, flux levels of the WFSM change, eventually settling to a new steady-state operating condition. This transition takes time. The delay depends on time constants of the WFSM and GCU. The delay is ultimately limited by a time response of the field winding to change the field voltage and armature reaction magnitudes.

While conventional methods and systems have generally been considered satisfactory for their intended purpose, there is still a need in the art for a system and method in which a generator having a WFSM achieves faster transient responses to large load changes than conventional transient responses that are delayed by a field winding changing field voltage and armature reaction magnitudes.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a controller is provided for a wound field synchronous machine (WFSM) of an electric power generation system (EPGS) The WFSM includes a field winding and a stator armature winding. The controller includes an adjustable component coupled to the WFSM and a power factor controller. The power factor controller is configured for adjusting the adjustable component to lower a power factor of the WFSM as a function of power output to a load of the EPGS to stabilize a current in the field winding.

In embodiments, the load is a DC load and the adjustable component can include an active rectifier. The active rectifier can be coupled between the WFSM and the load.

In embodiments, the controller further includes a generator control unit (GCU) regulating a voltage level at a point of regulation (POR) of the WFSM. The GCU can regulate a DC voltage level for a POR located between the active rectifier and the load, and the power factor controller can provide a power factor control signal to the active rectifier to regulate the power factor.

In embodiments, the controller further includes a GCU regulating a voltage level at a point of regulation (POR) of the EPGS. The GCU can regulate an AC voltage level for a POR located between the active rectifier and the WFSM, and the power factor controller can provide a power factor control signal to the active rectifier to regulate the power factor and can further regulate a DC level of voltage output by the active rectifier.

In embodiments, the adjustable component can include an active filter coupled between the WFSM and the load. The load can be an AC load.

In embodiments, the load can be a DC load, the EPGS can further include a passive rectifier coupled between the WFSM and the load, the active filter can be coupled between the WFSM and the passive rectifier, the passive rectifier can be configured to handle provision of power for the load operating at full power, and the active rectifier can be configured to handle an amount of reactive power needed to adjust the power factor when the load is operating at light power.

In embodiments, the adjustable component can include an inductance circuit that can be coupled to a node disposed between the WFSM and the load. The inductance circuit can selectively apply an amount of inductance to output of WFSM when the load is operates at light power to decrease the power factor of the WFSM. The load can be an AC load.

In embodiments, the load can be a DC load and the generator can further includes a passive rectifier coupled between the WFSM and the load.

In accordance with a further aspect, an EPGS is provided that includes the WFSM having a field winding and the controller.

In accordance with still a further aspect, a method is provided for controlling a WFSM of an EPGS. The method includes adjusting an adjustable component of the generator and controlling adjustment of the adjustable component to adjust a power factor of the WFSM as a function of power output to a load of the EPGS.

In embodiments, adjusting the adjustable component can include at least one of adjusting rectification or filtering of output from the WFSM.

These and other features of the systems and methods of the subject disclosure will become more readily apparent to those skilled in the art from the following detailed description of the embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE EMBODIMENTS

Figure 1:
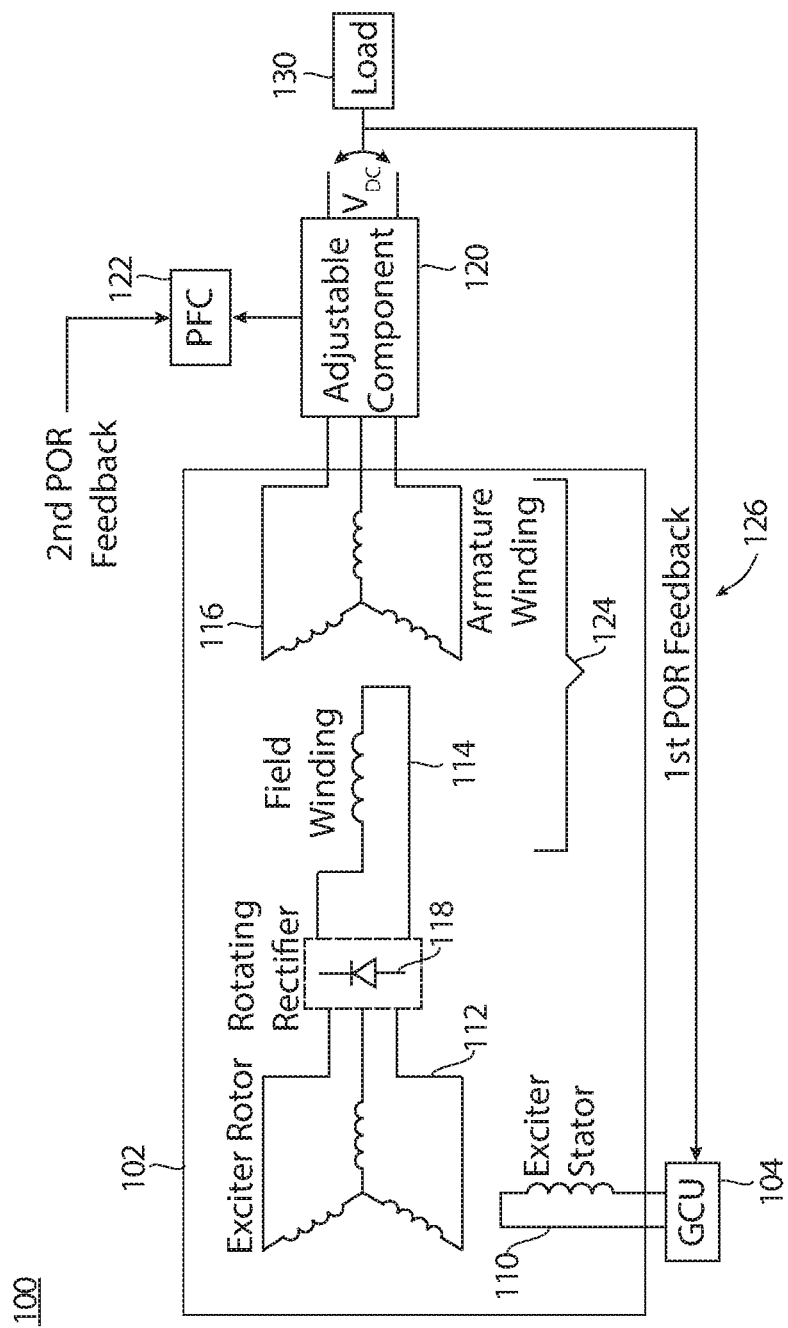
FIG. 1 shows a block diagram of an example electric power generation system (EPGS) having a wound frequency synchronous machine (WFSM) with power factor control in accordance with embodiments of the disclosure.

The illustrated embodiments are now described more fully with reference to the accompanying drawings wherein like reference numerals identify similar structural/functional features. The illustrated embodiments are not limited in any way to what is illustrated, as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

A system and method are provided for controlling a wound field synchronous machine (WFSM) of an electric power generator to have a transient response to large load changes that is not encumbered by delays associated with changes to field voltage and armature reaction magnitudes by a field winding. The generator includes a power factor controller for adjusting a power factor of the WFSM as a function of power at which a load powered by the generator operates, wherein the power factor is adjusted to stabilize a current in the field winding. The power factor is only lowered when load demands are lowered in order to increase the field voltage as well as the armature and armature reaction fluxes. While a lowered power factor increases losses in the WFSM, the power factor is only lowered when the load is light. This loss does not change the thermal performance of the generator at high load, which is the worst-case scenario for thermal performance.

Turning now descriptively to the drawings, in which similar reference characters denote similar elements throughout the several views, FIG. 1 shows an electric power generation system (EPGS) 100 consisting of generator 102 having an exciter stator 110 exciter rotor 112, rotating rectifier 118 and a WFSM 124.

The WFSM 124 includes a field winding 114 and a stator armature winding 116 of a stator (not shown). The exciter stator 110 and rotor 112 provide electrical current to the rotating rectifier 118, which in turn provides DC current to the field winding 114. The field winding 114 rotates about its axis. A field current in the field winding 114 generates a voltage in the stator armature winding 116. A generator control unit (GCU) 104 can receive a sensed voltage at a point-of-regulation (POR) (referred to as first POR feedback) via feedback path 126, and upon sensing a droop in the first POR feedback, increase the field current and subsequent resulting armature voltage via the exciter stator 110 and rotor 112. In addition, an adjustable component 120 is provided between the WFSM 124 and a load 130, wherein the adjustable component 120 can be adjusted to modify a power factor of the WFSM 124. A power factor controller (PFC) 122 receives a second POR feedback and controls the adjustable component 120 to modify the power factor of the WFSM 124. The second POR feedback can be the same or different from the first POR feedback, as described in greater detail below.

Figure 2:
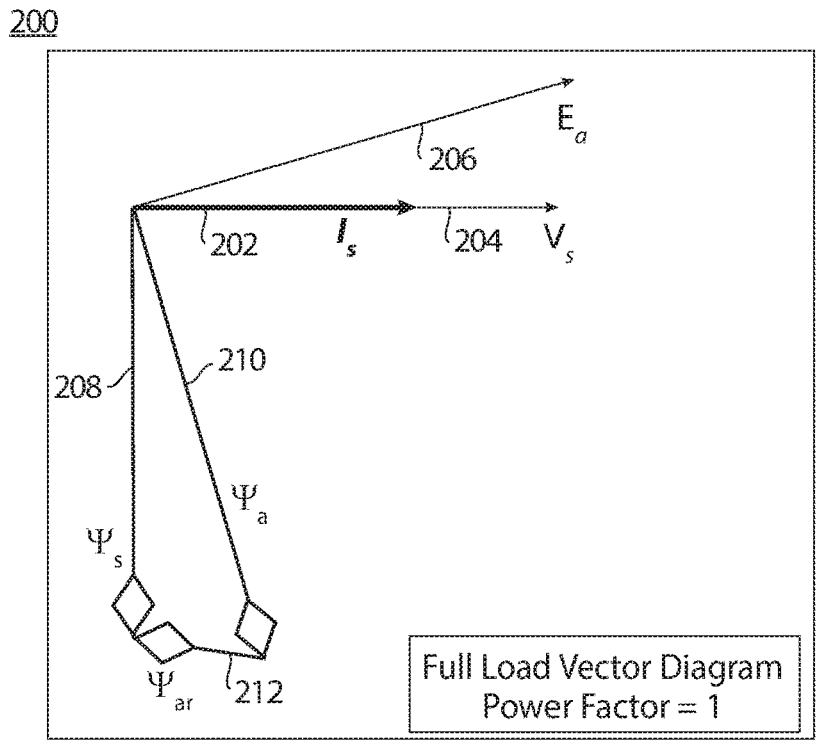
FIG. 2 shows a partial steady-state vector diagram for an example WFSM at full load with unity power factor.

With reference to FIG. 2, a partial vector diagram of an example WFSM in steady-state at full load with unity power factor (meaning stator current and stator voltage are in phase) where, $E_a$ is the field (armature) voltage vector,
$V_s$ is the stator voltage vector,
$I_s$ is the stator current vector,
$\Psi_a$ is the field armature flux vector,
$\Psi_s$ is the stator flux vector, and
$\Psi_{ar}$ is the armature reaction flux vector.

Figure 3:
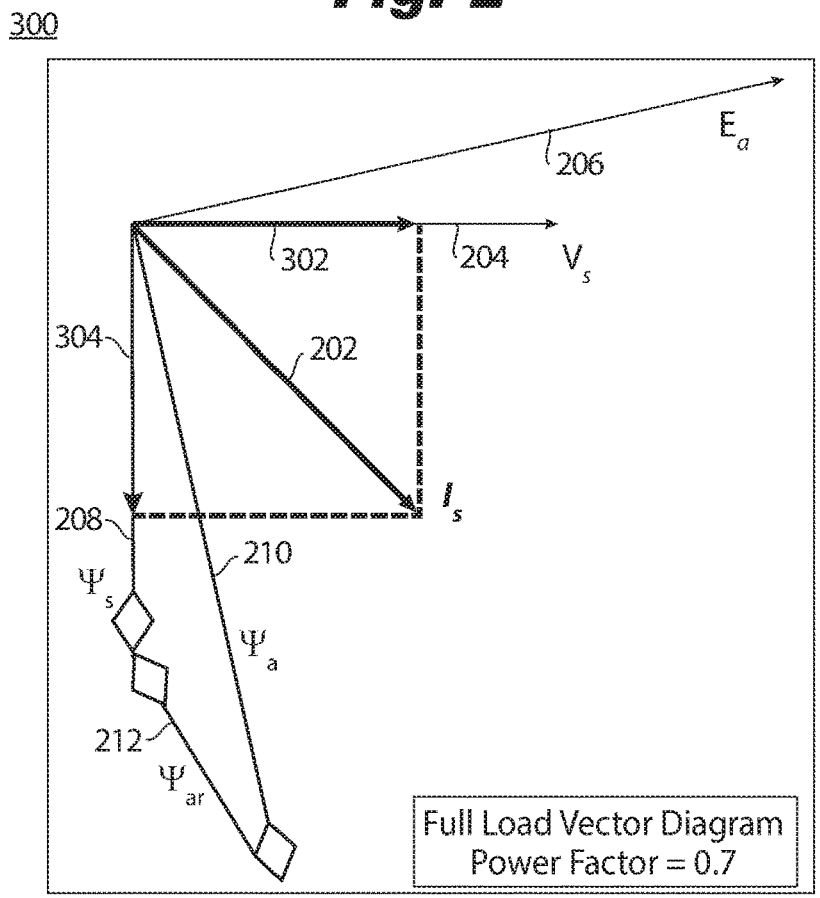
FIG. 3 shows a partial steady-state vector diagram for an example WFSM at full load with a power factor of 0.7 lagging.

FIG. 3 shows a partial vector diagram of an example WFSM at full load with the power factor is decreased to 0.7 (lagging) the stator voltage. As shown, the armature flux and armature reaction flux increase, as well as the overall current magnitude depicted by the length of the stator current vector $I_s$. In FIGS. 2 and 3, the stator voltage vector $V_s$, stator flux vector $\Psi_s$, and power (based on the horizontal component of the stator current $I_s$, which is the same) are the same. Based on the illustrated fundamental physics shown, decreasing the power factor (e.g., by adding reactive power), the armature reaction flux and field voltage are increased.

Figure 4:
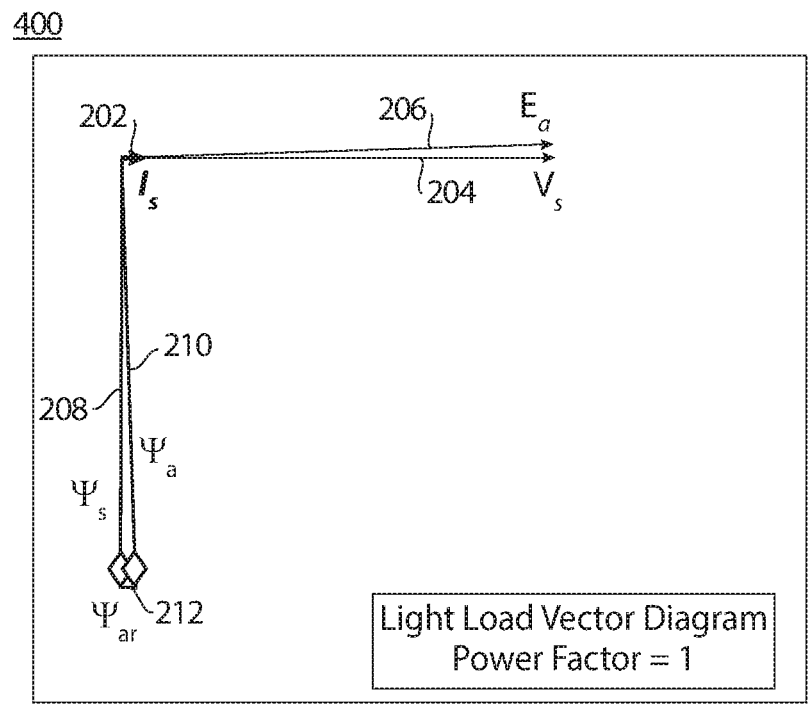
FIG. 4 shows a partial steady-state vector diagram for an example WFSM at 10% rated load with unity power factor.
Figure 5:
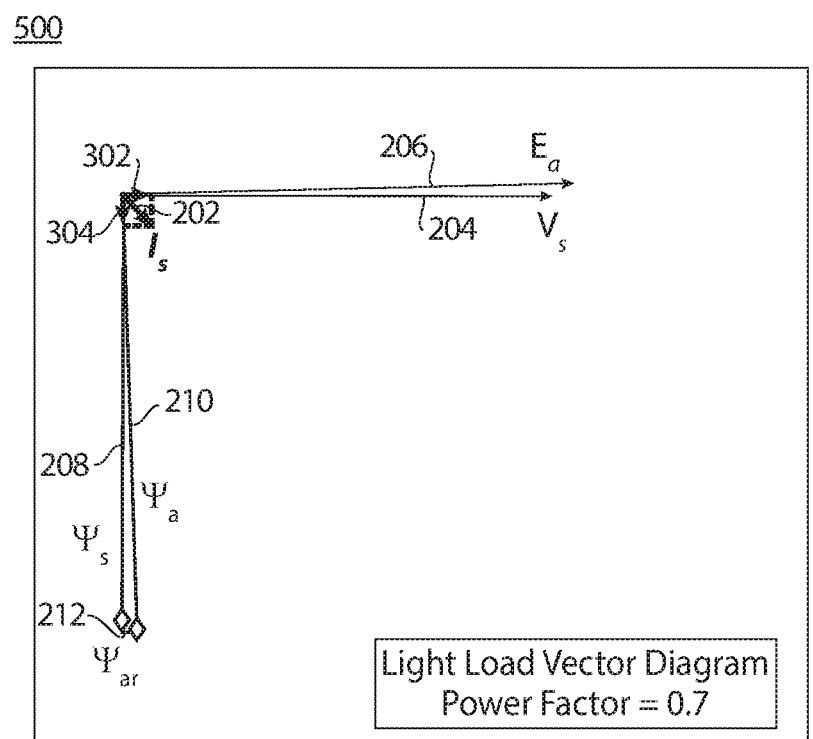
FIG. 5 shows a partial steady-state vector diagram for an example WFSM at 10% rated load with a power factor of 0.7 lagging.

FIG. 4 shows a partial vector diagram of an example WFSM at light load (~10% of full load) in steady state at light load with unity power factor. FIG. 5 shows a partial vector diagram of an example WFSM at light load with the power factor decreased to 0.7 (lagging) the field voltage.

Comparing FIGS. 2, 3 under full loads to respective FIGS. 4, 5, under light loads, the magnitude of the field voltage and armature reaction flux is much smaller than the full load case, as indicated by the length of the corresponding vectors. When control is provided solely by the GCU 104, in order for the generator 102 to respond to a step load transient from light load to full load, in a GCU control loop, the GCU 104 would sense a voltage droop at the POR and increase the exciter voltage, which would subsequently result in an increase of the exciter current and field voltage. Next, machine flux levels would change, eventually settling to a new steady-state operating condition. These transitions takes time, wherein the delay depends on time constants of the generator 102 and GCU 104. The delay is dependent on the time response of the GCU control loop, exciter time constants and the stator armature winding.

Figure 6:
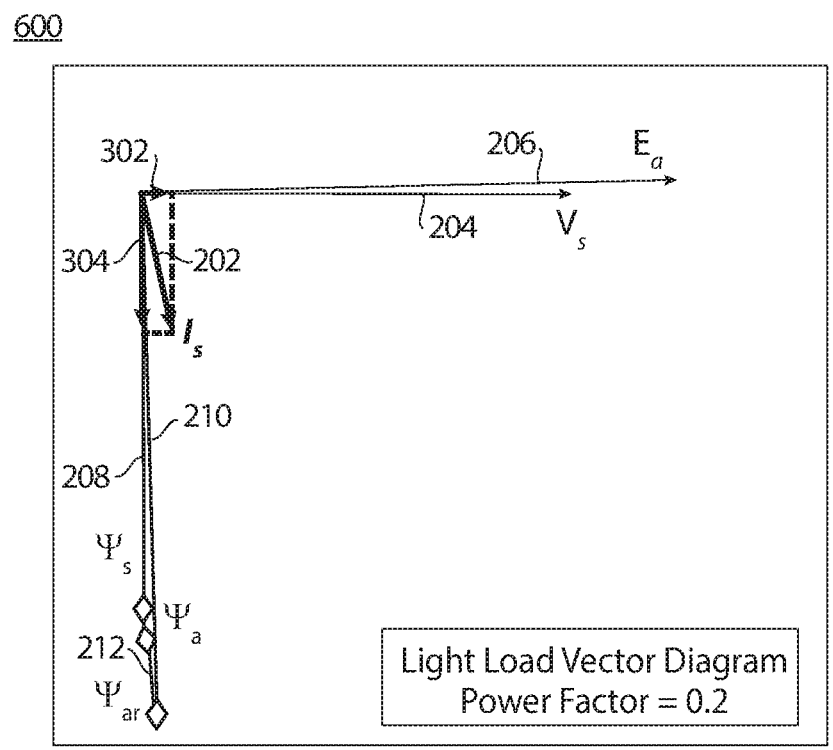
FIG. 6 shows a partial steady-state vector diagram for an example WFSM at 10% rated load with a power factor of 0.2 lagging.

FIG. 6 illustrates an improvement in the transient response to large load changes by showing a partial vector diagram of an example generator 102 at light load with the power factor is decreased to 0.2 (lagging), the stator voltage. As shown, the field voltage and armature reaction flux are increased by operating the EPGS 100 using a lower power factor. While the reduction in power factor increases losses in the generator 102, the increase in losses is only applied at light loads and does not affect thermal performance of the system when operating, at a worst case, with high load.

Figure 7A:
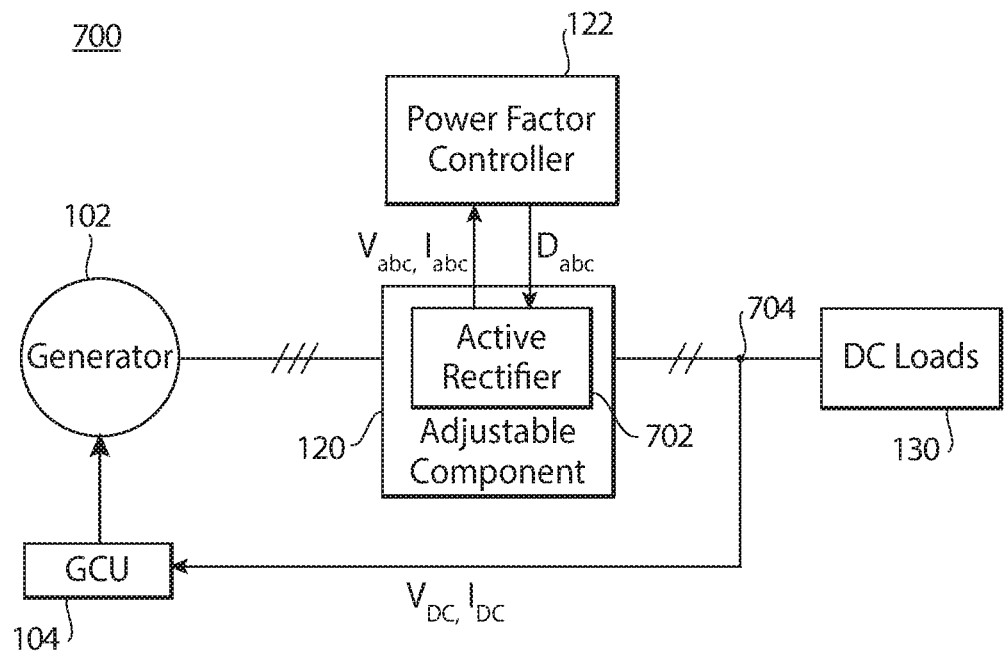
FIG. 7A shows an embodiment of an example generator of FIG. 1 with a DC load using an active rectifier.

FIGS. 7A-11 illustrate several non-exclusive embodiments of an electric power generation system (EPGS), such as EPGS 100 (shown in FIG. 1), for adjusting the power factor of the WFSM 124. FIGS. 7A and 7B show respective example embodiments of EPGSs 700 and 750 that provides power to a load 130, the EPGSs 700 and 750 each including generator 102 that receives control signals from GCU 104 and adjustable component 120, where adjustable component 120 is controlled by a PFC (PFC 122 in FIG. 7A and PFC 122B in FIG. 7B). As shown in FIGS. 7A and 7B, the adjustable component 120 includes an active rectifier 702, and the active rectifier 702 is controlled by the PFC 122 or PFC 122B. Active component 120, including active rectifier 702 is coupled between generator 102 and load 130. Load 130 is a DC load and the GCU receives $V_{DC}$ and $I_{DC}$ feedback from a POR 704.

The PFC (PFC 122 in FIG. 7A and PFC 122B in FIG. 7B) and active rectifier 702 are configured to adjust reactive power of the generator 102 under light load. The PFC (PFC 122 in FIG. 7A and PFC 122B in FIG. 7B) decreases the power factor of the generator (generator 102 in FIGS. 7A and 7B) as a function of load. The active rectifier 702 can include an analog and/or digital device. The PFC can include analog and/or digital components, such as a microprocessor, field programmable gate array (FPGA), application specific integrated circuit (ASIC), microcontroller, programmable logic device (PLD), a digital signal processor (DSP), etc.

With reference to FIG. 7A, the POR 704 is positioned between the active rectifier 702 and load 130. GCU 104 receives $V_{DC}$ and $I_{DC}$ and regulates the level of DC voltage VDC. PFC 122 receives AC signals $V_{abc}$ and $I_{abc}$ and provides a power factor control signal $D_{abc}$ to active rectifier 702 to regulate the power factor, without regulating DC voltage.

Figure 7B:
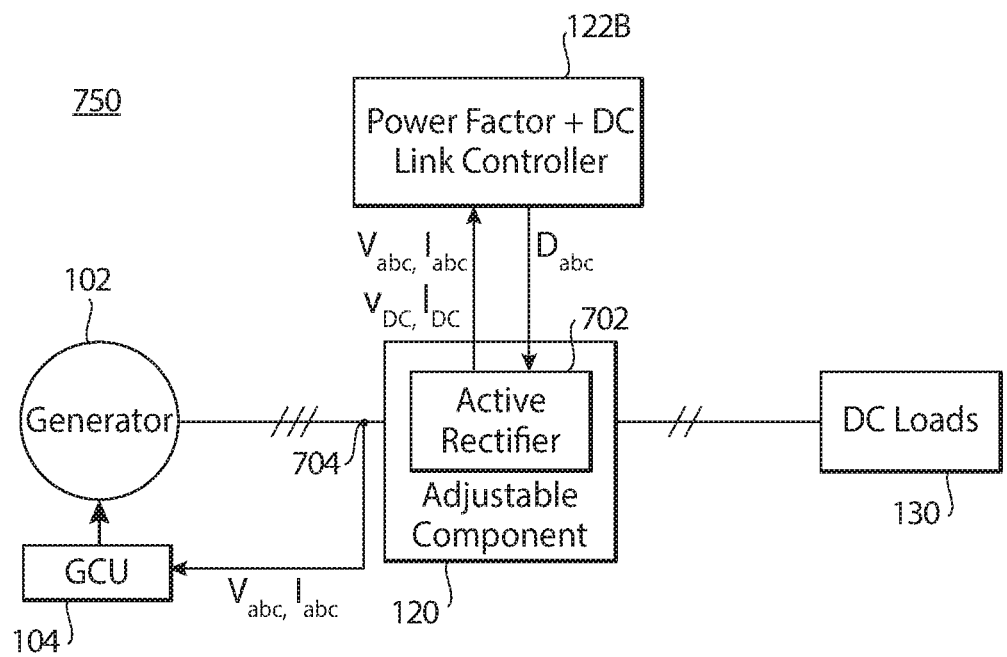
FIG. 7B shows another embodiment of an example generator of FIG. 1 with a DC load using an active rectifier.

With reference to FIG. 7B, the POR 704 is positioned between the generator 102 and active rectifier 702. GCU 104 receives AC signals $V_{abc}$ and $I_{abc}$ and regulates the level of AC voltage $V_{abc}$. PFC 122B receives VDC, $I_{DC}$, $V_{abc}$, and $I_{abc}$ and provides power factor control signal $D_{abc}$ to active rectifier 702 to regulate both the power factor and the DC voltage level.

Figure 8:
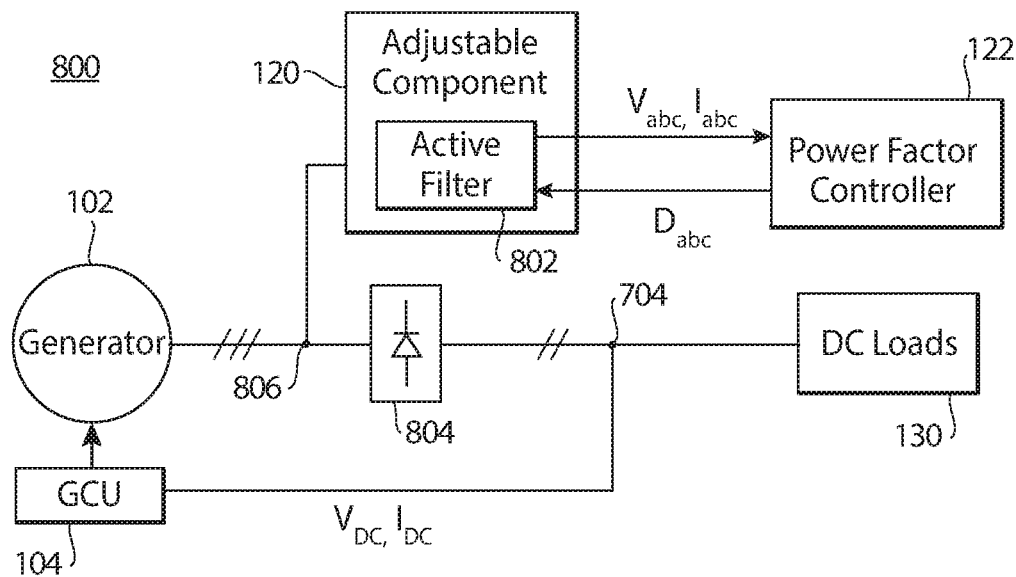
FIG. 8 shows an embodiment of an example generator of FIG. 1 with a DC load using an active filter.

With reference to FIG. 8, an embodiment of an example EPGS 800 providing power to a load 130 is shown. Load 130 is a DC load and the GCU 104 receives $V_{DC}$ and $I_{DC}$ feedback from a POR 704. EPGS 800 has similar functionality and structure as EPGS 700 (shown in FIG. 7A), except that instead of an active rectifier, a passive rectifier 804 is coupled between generator 102 and load 130. Furthermore, adjustable component 120 includes an active filter 802, wherein active component 120, including active filter 802, is coupled between a node 806 and PFC 122, wherein node 806 is coupled between WFSM 124 and passive rectifier 804. The active filter 802 and passive rectifier 804 can each include an analog and/or digital device.

PFC 122 and active filter 802 are configured to adjust reactive power of the generator 102 under light load. PFC 122 decreases the power factor of EPGS 800 as a function of load. POR 704 is positioned between the passive rectifier 804 and load 130. GCU 104 receives VDC and $I_{DC}$ and regulates the level of DC voltage $V_{DC}$. PFC 122 receives AC signals $V_{abc}$ and $I_{abc}$ from active filter 802 and provides a power factor control signal $D_{abc}$ to active filter 802 to regulate the power factor. Passive rectifier 804 can be sized to handle full power, wherein active filter 802 can be sized to handle an amount of reactive power needed to adjust the power factor at light loads. Accordingly, the capacity, and hence footprint, of active filter 802 can be small relative to passive rectifier 804.

Figure 9:
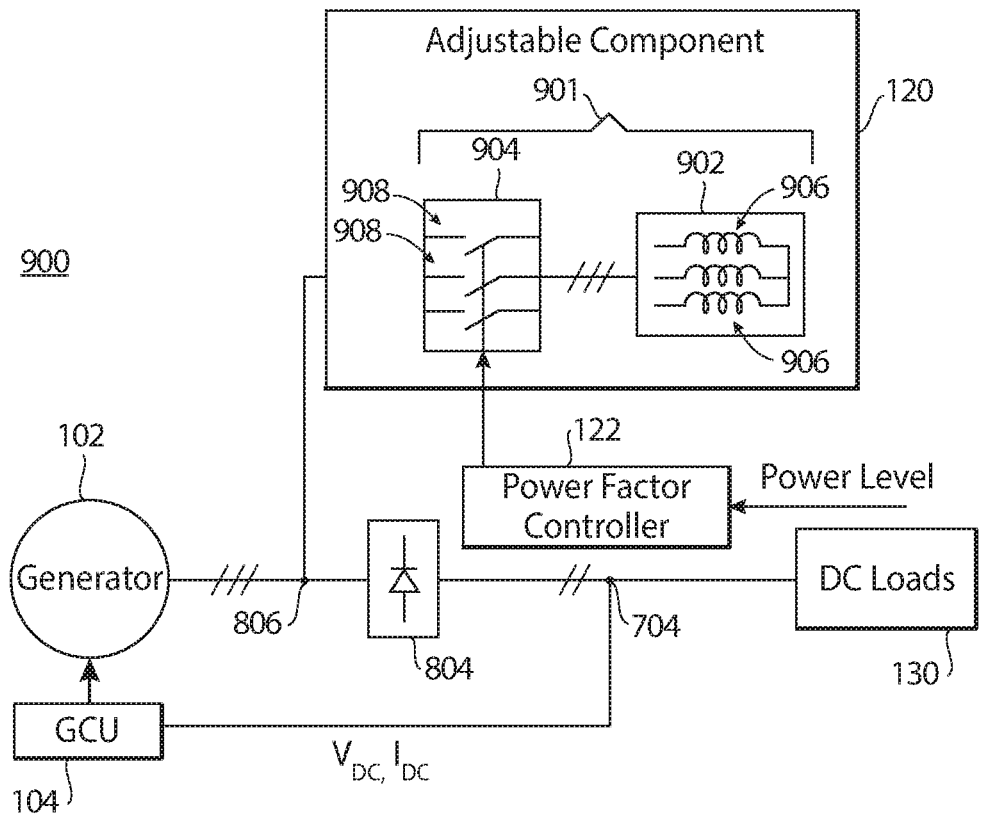
FIG. 9 shows an embodiment of an example generator of FIG. 1 with a DC load using an inductance circuit.

With reference to FIG. 9, an embodiment of an example EPGS 900 providing power to a load 130 is shown. Load 130 is a DC load and the GCU receives $V_{DC}$ and $I_{DC}$ feedback from a POR 704. EPGS 900 has similar functionality and structure as EPGS 800 (shown in FIG. 8), except that adjustable component 120 includes an inductance circuit 901 (instead of active filter 802). Inductance circuit 901 is configured to selectively add an amount of inductance to output of generator 102 for adding inductance under light loads to decrease the power factor of EPGS 900. Passive rectifier 804 is coupled between generator 102 and load 130. Furthermore, active component 120, including inductance circuit 901, is coupled between a node 806 and PFC 122, wherein node 806 is coupled between generator 102 and passive rectifier 804. The inductance circuit 901 can include an analog and/or digital device.

Inductance circuit 901 includes a filter 902 and a contact bank 904. Filter 902 provides an inductor 906 per phase and contact bank 904 provides one or more contacts 908 for controlling each of the inductors 906. The contacts 908 can be associated with the inductors 906 in one-to-one correspondence. The contacts 908 are controlled by PFC 122 to close contacts 908 in order to apply inductance via inductors 906 to a signal delivered by generator 102 via node 806 when the power level is low, thus reducing the power factor. By controlling the contacts 908, the PFC 122 can cause inductor 906 to operate on all phases or no phases of the signal delivered by generator 102. PFC 122 receives a power level that is proportional to output (AC or DC) of the EPGS 900. For example, the power level can be provided from a sensor provided at a node, such as node 806, or a selectable node between the generator 102 and load 130. When the power level exceeds a predetermined threshold, the contacts 908 can be closed to apply inductors 906 of filter 902.

In embodiments, the inductance circuit 901 can include multiple filters, such that a selected one of the filters 902 can be enabled by contact bank 904 in association with a discrete power level, each filter 902 being associated with a different discrete power level. In this way, a selected amount of inductance can be applied to the output of generator 102 as a function of the power level.

PFC 122 and inductive circuit 901 are configured to adjust reactive power of the generator 102 under light load. PFC 122 decreases the power factor of generator 900 as a function of load. In the example shown, POR 704 is positioned between the passive rectifier 804 and load 130. GCU 104 receives $V_{DC}$ and $I_{DC}$ and regulates the level of DC voltage $V_{DC}$. PFC 122 receives the power level and provides a power factor control signal to contact bank 904 to regulate the power factor.

Figure 10:
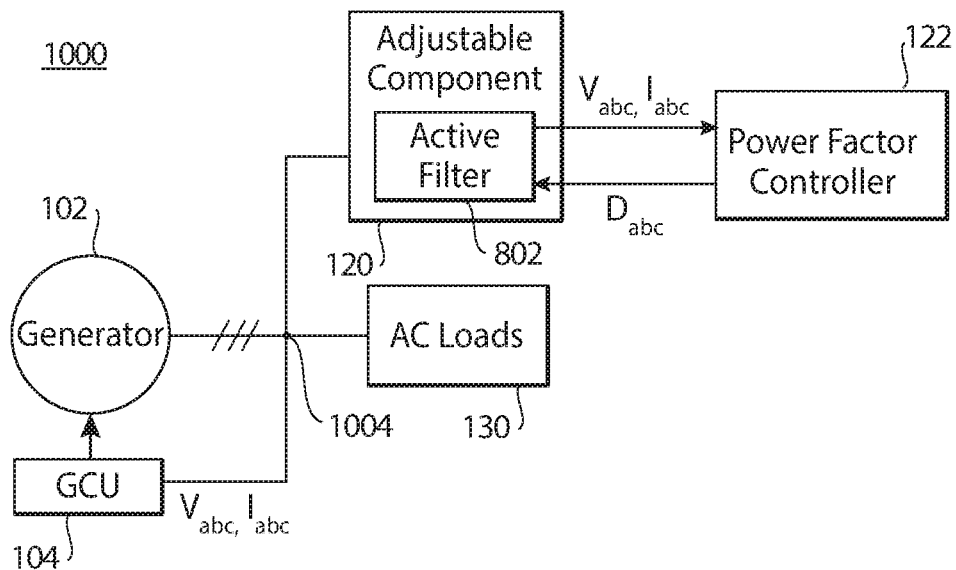
FIG. 10 shows an embodiment of an example generator of FIG. 1 with an AC load using an active filter.

With reference to FIG. 10, an embodiment of an example EPGS 1000 providing power to a load 130 is shown. Load 130 is an AC load and GCU 104 receives $V_{ABC}$ and $I_{ABC}$ feedback from a POR 1004. EPGS 1100 has similar functionality and structure as EPGS 900 (shown in FIG. 9), except that load 130 is an AC load, and the EPGS 1000 does not include a passive rectifier (such as passive rectifier 804 in FIG. 9). Adjustable component 120, including active filter 802, is coupled to a node 1004, wherein node 1004 is coupled between generator 102 and load 130.

PFC 122 is coupled to active filter 802, wherein PFC 122 and active filter 802 are configured to adjust reactive power of the generator 102 under light load. PFC 122 decreases the power factor of EPGS 1000 as a function of load. GCU 104 and PFC 122 receive $V_{abc}$ and $I_{abc}$ output by active filter 802. GCU 104 regulates the level of AC voltage $V_{abc}$. PFC 122 provides a power factor control signal $D_{abc}$ to active filter 802 to regulate the power factor.

Figure 11:
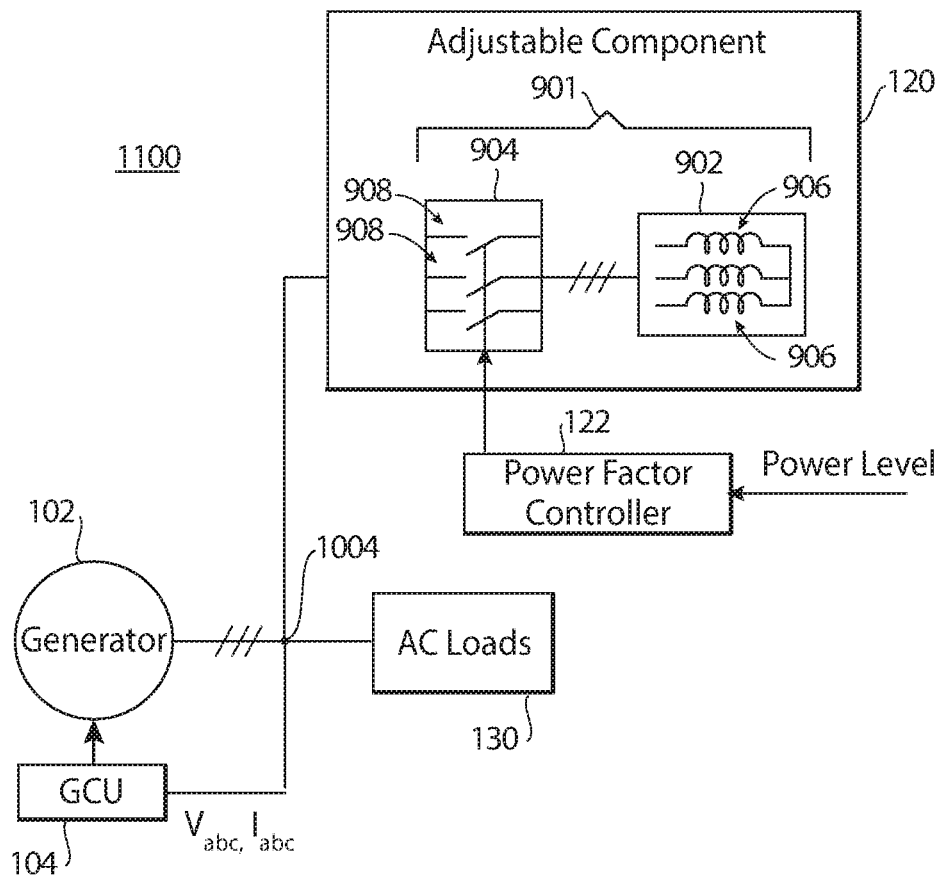
FIG. 11 shows an embodiment of an example generator of FIG. 1 with an AC load using an inductance circuit.

With reference to FIG. 11, an embodiment of an example EPGS 1100 providing power to a load 130 is shown. Load 130 is an AC load and GCU 104 receives $V_{ABC}$ and $I_{ABC}$ feedback from a POR 704. EPGS 1100 has similar functionality and structure as EPGS 900 (shown in FIG. 9), except that load 130 is an AC load, and the EPGS 1000 does not include a passive rectifier (such as passive rectifier 804 in FIG. 9). Adjustable component 120, including inductance circuit 901, is coupled to a node 1004, wherein node 1004 is coupled between generator 102 and load 130.

PFC 122 is coupled to inductance circuit 901, wherein PFC 122 and inductance circuit 901 are configured to adjust reactive power of the generator 102 under light load. PFC 122 decreases the power factor of EPGS 1100 as a function of load. GCU 104 receives $V_{abc}$ and $I_{abc}$ output by inductance circuit 901. GCU 104 regulates the level of AC voltage $V_{abc}$. PFC 122 receives the power level. Based on the power level received, PFC 122 determines and provides a power factor control signal $D_{abc}$ to contact bank 904 to regulate the power factor.

With references to FIGS. 7A-11, in embodiments, the PFC (PFC 122 in FIGS. 7A and 8-11 and PFC 122B in FIG. 7B) and GCU 104 can share functionality and/or components, and/or can be configured as a single unit. Although FIGS. 7A-11 each depict a three-phase generator, the disclosure is not limited to specific number of phases, and the generator can be an n-phase generator.

Figure 12:
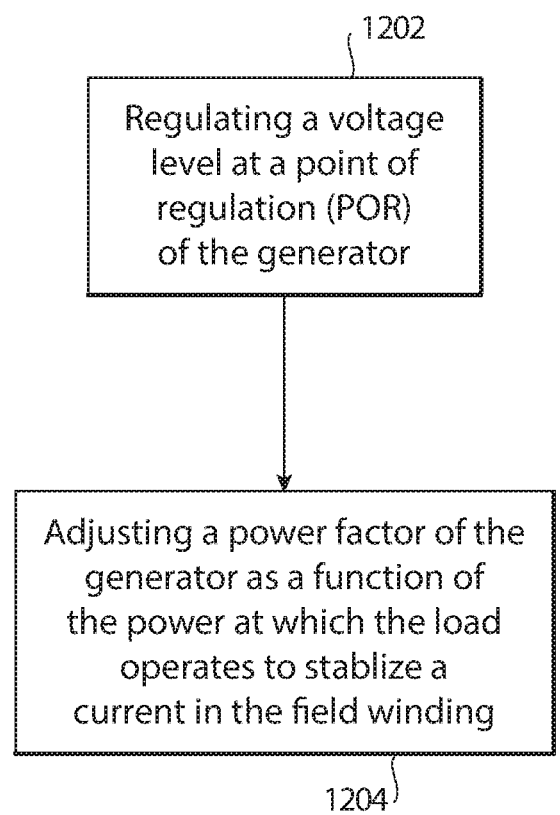
FIG. 12 is a flowchart of an example method for controlling a generator of an EPGS in accordance with an embodiment of the disclosure.

FIG. 12 shows an exemplary and non-limiting flowchart 1200 illustrating a method for controlling a generator of an EPGS in accordance with certain illustrated embodiments. The method can be performed by an adjustable component and a PFC, such as adjustable component 120 and PFC 122 to control a generator, such as generator 102, all shown in FIG. 1. Before turning to description of FIG. 12, it is noted that the flowchart in FIG. 12 shows an example in which operational steps are carried out in a particular order, as indicated by the lines connecting the blocks, but the various steps shown in this diagram can be performed in a different order, or in a different combination or sub-combination. It should be appreciated that in some embodiments some of the steps described below may be combined into a single step. In some embodiments, one or more additional steps may be included. In some embodiments, one or more of the steps can be omitted.

Operation 1202 includes regulating a voltage level at a point of regulation (POR) of the generator. Operation 1204 includes adjusting a power factor of the generator as a function of the power at which the load operates to stabilize a current in the field winding. Adjusting the power factor can include increasing flux and reactive flux of a stator armature winding and voltage of a field winding of the WFSM.

Aspects of the present disclosure are described above with reference to block diagrams of methods, apparatus (systems) and computer program products according to embodiments of the disclosure. Features of the methods described include operations, such as equations, transformations, conversions, etc., that can be performed using analog devices, software, hardware, and/or firmware. Regarding software implementations, it will be understood that individual blocks of the block diagram illustrations and combinations of blocks in the block diagram illustrations, can be implemented by computer program instructions, hardware, or analog devices. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block diagram block or blocks.

Figure 13:
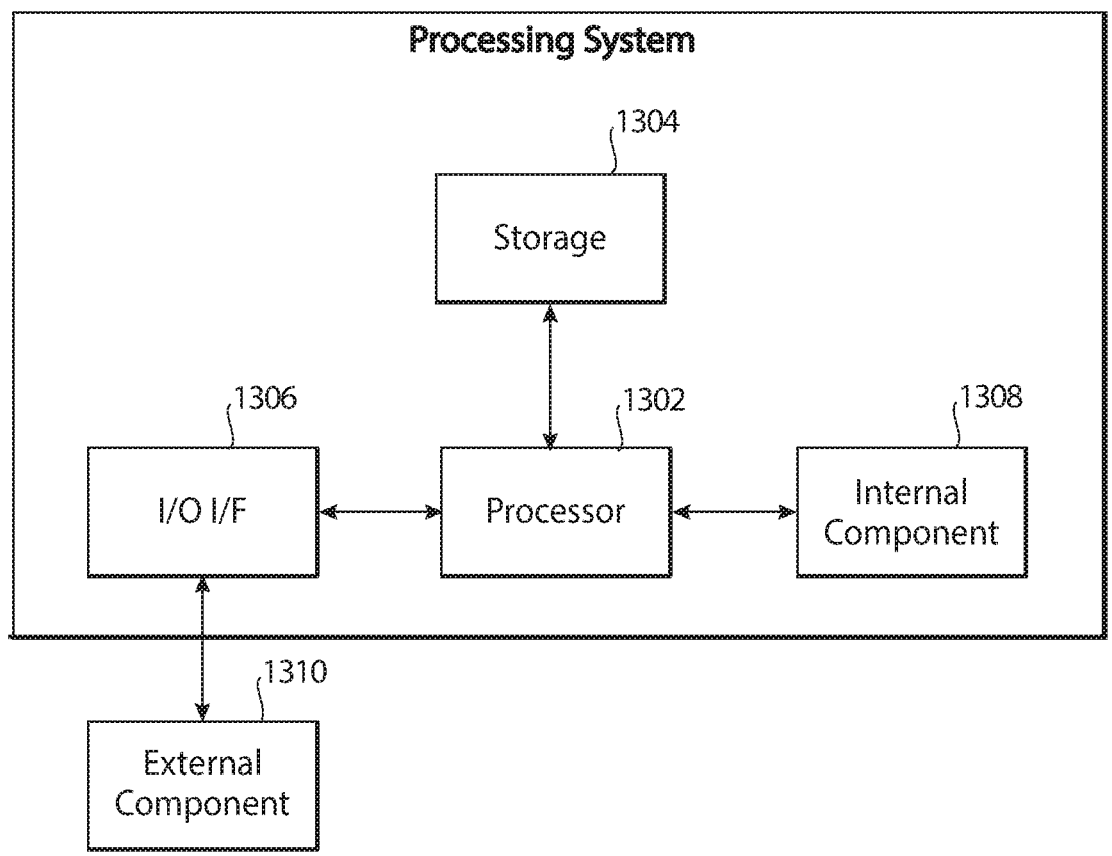
FIG. 13 is a block diagram of an exemplary computer system configured to implement components of a generator controller unit and/or power factor control unit of FIG. 1.

With reference to FIG. 13, a block diagram of an example computing system 1300 is shown, which provides an example configuration of PFC 122 and/or GCU 104. Computing system 1300 is only one example of a suitable system and is not intended to suggest any limitation as to the scope of use or functionality of embodiments of the disclosure described herein. Computing system 1300 can be implemented using hardware, software, and/or firmware. Regardless, computing system 1300 is capable of being implemented and/or performing functionality as set forth in the disclosure.

Computing system 1300 is shown in the form of a general-purpose computing device. Computing system 1300 includes a processing device 1302, memory 1304, an input/output (I/O) interface (I/F) 1306 that can communicate with an internal component 1308, and optionally an external component 1310.

The processing device 1302 can include, for example, a PLOD, microprocessor, DSP, a microcontroller, an FPGA, an ASIC, and/or other discrete or integrated logic circuitry having similar processing capabilities.

The processing device 1302 and the memory 1304 can be included in components provided in the FPGA, ASIC, microcontroller, or microprocessor, for example. Memory 1304 can include, for example, volatile and non-volatile memory for storing data temporarily or long term, and for storing programmable instructions executable by the processing device 1302. I/O I/F 1306 can include an interface and/or conductors to couple to the one or more internal components 1308 and/or external components 1310.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of the PFC 122 and/or GCU 104 may be implemented or executed by one or more computer systems, such as a microprocessor. Each computer system 1300 can implement PFC 122 and/or GCU 104, or multiple instances thereof. In various embodiments, computer system 1300 may include one or more of a microprocessor, an FPGA, ASIC, microcontroller. The computer system 1300 can be provided as an embedded device. All or portions of the computer system 1300 can be provided externally, such by way of a mobile computing device, a smart phone, a desktop computer, a laptop, or the like.

Computer system 1300 is only one example of a suitable system and is not intended to suggest any limitation as to the scope of use or functionality of embodiments of the disclosure described herein. Regardless, computer system 1300 is capable of being implemented and/or performing any of the functionality set forth hereinabove.

Computer system 1300 may be described in the general context of computer system-executable instructions, such as program modules, being executed by a computer system. Generally, program modules may include routines, programs, objects, components, logic, data structures, and so on that perform particular tasks or implement particular abstract data types.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A controller for a Wound Field Synchronous Machine (WFSM) of an electric power generation system (EPGS), the WFSM having a field winding that interacts with a stator armature winding, the controller comprising:
   an adjustable component coupled between a generator of the WFSM and the load; and
   a power factor controller configured to:
   adjust, before occurrence of a transient or at steady state, the adjustable component to decrease a power factor of the WFSM as a function of load of the EPGS responsive to sensing that the load demands light power below a threshold percentage of full power for providing an improved transient response to a change in sensed load demand; and
   receive feedback of electrical properties of output from the adjustable component, wherein the feedback is used to determine the adjustment.

2. The controller of claim 1, wherein the load is a DC load and the adjustable component includes an active rectifier.

3. The controller of claim 2, wherein the active rectifier is coupled between the WFSM and the load.

4. The controller of claim 3, further comprising a generator control unit (GCU) regulating a voltage level at a point of regulation (POR) of the EPGS, wherein the GCU regulates a DC voltage level for a POR node located between the active rectifier and the load, and the power factor controller provides a power factor control signal to the active rectifier to regulate the power factor.

5. The controller of claim 3, further comprising a generator control unit (GCU) regulating a voltage level at a point of regulation (POR) of the EPGS, wherein the GCU regulates an AC voltage level for a POR node located between the active rectifier and the WFSM, and the power factor controller provides a power factor control signal to the active rectifier to regulate the power factor and further regulates a DC level of voltage output by the active rectifier.

6. The controller of claim 1, wherein the adjustable component includes an active filter coupled between the WFSM and the load.

7. The controller of claim 6, wherein the load is an AC load.

8. The controller of claim 6, wherein the load is a DC load, the generator further includes a passive rectifier coupled between the WFSM and the load, the active filter is coupled between the WFSM and the passive rectifier, the passive rectifier is configured to handle provision of power for the load operating at full power, and the active rectifier is configured to handle an amount of reactive power needed to adjust the power factor when the load is operating at light power.

9. The controller of claim 1, wherein the adjustable component includes an inductance circuit coupled to a node disposed between the WFSM and the load to selectively apply an amount of inductance to output of WFSM when the load is operates at light power to decrease the power factor of the WFSM.

10. The controller of claim 9, wherein the load is an AC load.

11. The controller of claim 9, wherein the load is a DC load, the EPGS further includes a passive rectifier coupled between the WFSM and the load.

12. The controller of claim 1, further comprising a general voltage controller (GCU) that controls an output voltage output by the WFSM to a load of the WFSM, the controlling by the GCU having delays, the delays being associated with changing a field voltage of the WFSM by waiting for the GCU to sense a change in the output voltage, and in response causing an excitation to eventually affect a field winding and a stator armature winding of the WFSM, wherein the power factor controller controls the output voltage separate from control of the output voltage by the general voltage controller, wherein the control of the output voltage by the power factor controller affects the field voltage and avoids and/or reduces the delays.

13. The controller of claim 1, wherein the load demands light power when the load demands about ten percent of normal load demand.

14. The controller of claim 1, wherein the power factor is decreased to 0.2 lagging.

15. An electric power generation system (EPGS) comprising:
- a wound field synchronous machine (WFSM) having a field winding and a stator armature winding that interacts with the field winding to output power to a load; and
- a controller, the controller comprising:
  - an adjustable component coupled between a generator of the WFSM and the load; and
  - power factor controller configured to:
    - adjust, before occurrence of a transient or at steady state, the adjustable component to lower a power factor of the WFSM as a function of load of the EPGS responsive to sensing that the load demands light power below a threshold percentage of full power for providing an improved transient response to a change in sensed load demand; and
    - receive feedback of electrical properties of output from the adjustable component, wherein the feedback is used to determine the adjustment.

16. The EPGS of claim 15, wherein the load is a DC load and the adjustable component includes an active rectifier.

17. The EPGS of claim 16, wherein the active rectifier is coupled between the WFSM and the load.

18. The EPGS of claim 17, further comprising a generator control unit (GCU) regulating a voltage level at a point of regulation (POR) of the electric power generation system (EPGS), wherein:
- the GCU regulates a DC voltage level for a POR node located between the active rectifier and the load, and the power factor controller provides a power factor control signal to the active rectifier to regulate the power factor, or
- the GCU regulates an AC voltage level for a POR located between the active rectifier and the WFSM, and the power factor controller provides a power factor control signal to the active rectifier to regulate the power factor and further regulates a DC level of voltage output by the active rectifier.

19. The controller of claim 15, wherein the adjustable component includes an active filter coupled between the WFSM and the load.

20. The controller of claim 19, wherein the load is an AC load or wherein the load is a DC load and the EPGS further comprising a passive rectifier coupled between the WFSM and the load, the active filter is coupled between the WFSM and the passive rectifier, the passive rectifier is configured to handle provision of power for the load operating at full power, and the active rectifier is configured to handle an amount of reactive power needed to adjust the power factor when the load is operating at light power.

21. The controller of claim 15, wherein the adjustable component includes an inductance circuit coupled to a node disposed between the WFSM and the load to selectively apply an amount of inductance to output of WFSM when the load is operates at light power to decrease the power factor of the EPGS.

22. A method for controlling a wound field synchronous machine (WFSM) of an electric power generation system (EPGS), the method comprising:
- adjusting, before occurrence of a transient or at steady state, an adjustable component of the EPGS to decrease a power factor of the WFSM as a function of load of the EPGS responsive to sensing that the load demands light power below a threshold percentage of full power for providing an improved transient response to a change in sensed load demand;
- receiving feedback of electrical properties of output from the adjustable component; and
- controlling adjustment of the adjustable component of the EPGS using the feedback to decrease a power factor of the WFSM as a function of load of the EPGS responsive to sensing that the load demands light power below a threshold percentage of full power for providing an improved transient response to a change in sensed load demand.

23. The method of claim 22, wherein adjusting the adjustable component includes at least one of adjusting rectification or filtering of output from the WFSM.

* * * * *